US010487973B2

(12) United States Patent
Barsali et al.

(10) Patent No.: US 10,487,973 B2
(45) Date of Patent: Nov. 26, 2019

(54) MOUNTING SYSTEM FOR ROTATING MACHINERY

(71) Applicant: Nuovo Pignone Tecnologie Srl, Florence (IT)

(72) Inventors: Jacopo Barsali, Florence (IT); Valentina Bisio, Florence (IT); Emanuele Checcacci, Florence (IT); Francesco Capanni, Florence (IT); Roberto Merlo, Florence (IT)

(73) Assignee: Nuovo Pignone Tecnologie Srl, Florence (IT)

(*) Notice: Subject to any disclaimer, the term of this patent is extended or adjusted under 35 U.S.C. 154(b) by 0 days.

(21) Appl. No.: 15/809,251

(22) Filed: Nov. 10, 2017

(65) Prior Publication Data
US 2018/0172198 A1 Jun. 21, 2018

(30) Foreign Application Priority Data

Dec. 16, 2016 (IT) .......................... 102016000127545

(51) Int. Cl.
F16M 1/04 (2006.01)
F01D 25/28 (2006.01)
(Continued)

(52) U.S. Cl.
CPC ............... *F16M 1/04* (2013.01); *F01D 25/04* (2013.01); *F01D 25/28* (2013.01); *F16F 15/022* (2013.01);
(Continued)

(58) Field of Classification Search
CPC .... F16M 1/04; F16M 7/00; F16M 5/00; F16F 15/022; F16F 15/067; F01D 25/04;
(Continued)

(56) References Cited

U.S. PATENT DOCUMENTS 2,200,859 A 5/1940 Leonard
3,281,101 A * 10/1966 May ..................... B23Q 1/0054
248/188.3
(Continued)

FOREIGN PATENT DOCUMENTS

WO 2016/059468 A1 4/2016

OTHER PUBLICATIONS

Italian Search Report and Written Opinion issued in connection with corresponding IT Application No. 102016000127545 dated Aug. 22, 2017.

*Primary Examiner* — Muhammad Ijaz
(74) *Attorney, Agent, or Firm* — Baker Hughes Patent Organization

(57) ABSTRACT

A mounting system for supporting rotary machinery on a supporting structure of an off-shore installation, the system including a base frame provided with an upper side, for mounting the rotary machinery and a lower side, a set of at least four supporting members arranged at the lower side of the base frame and adapted to be placed on the supporting structure to act as an intermediate layer or frame between the base frame and the supporting structure in mounting condition. The supporting members include resilient elements generating a reaction force when subject to load and are configured to transfer to the base frame stresses and/or strains lower than allowable limits also in case of deformation of the supporting structures; the base frame has stiffness such as to guarantee design acceptance criteria for example for rotary machinery alignment, terminal points or interface point displacement, dynamic behavior or like parameters.

18 Claims, 4 Drawing Sheets

(51) Int. Cl.
*F16F 15/067* (2006.01)
*F16M 5/00* (2006.01)
*F16M 7/00* (2006.01)
*F01D 25/04* (2006.01)
*F16F 15/02* (2006.01)
*B63B 35/44* (2006.01)

(52) U.S. Cl.
CPC ............. *F16F 15/067* (2013.01); *F16M 5/00* (2013.01); *F16M 7/00* (2013.01); *B63B 35/44* (2013.01); *F05D 2220/76* (2013.01); *F05D 2240/91* (2013.01)

(58) Field of Classification Search
CPC .. F01D 25/28; F05D 2220/76; F05D 2240/91; B63B 35/44
USPC ................ 248/560, 562, 565, 566, 576, 578
See application file for complete search history.

(56) References Cited

U.S. PATENT DOCUMENTS

| | | | | |
|---|---|---|---|---|
| 4,489,991 A | * | 12/1984 | Delam | F16F 15/04 248/638 |
| 5,169,110 A | * | 12/1992 | Snaith | F16F 7/14 248/570 |
| 5,386,962 A | | 2/1995 | Adriance et al. | |
| 5,595,371 A | * | 1/1997 | Hukuda | F16F 15/067 267/34 |
| 2007/0131839 A1 | * | 6/2007 | Dunn | B63H 21/16 248/637 |
| 2015/0159370 A1 | * | 6/2015 | Ruan | E02D 27/42 52/167.4 |
| 2015/0369331 A1 | * | 12/2015 | Zhu | F16F 15/067 248/614 |

* cited by examiner

MOUNTING SYSTEM FOR ROTATING MACHINERY

CROSS REFERENCE TO RELATED APPLICATION

The present application claims the benefit of Italian Application No. 102016000127545, filed Dec. 16, 2016.

TECHNICAL FIELD

Embodiments of the subject matter disclosed herein relate generally to mounting apparatuses and systems for rotating machines, such as gas turbine engines, electric motors, generators, turbo-compressors and the like. More particularly, the disclosure relates to improvements to such mounting systems and apparatuses for use in the oil and gas industry in offshore installations.

BACKGROUND OF THE INVENTION

Specialized mounting systems have been developed for various machinery arrangements in different technical fields. It has been found that for relatively large, bulky machines such as gas turbines, large electric generators and turbo-compressors, mounting systems must often be developed, which can provide robust support and stability to the machinery components, while being tailored to specific machine designs. Mounting strategies often must further account for the environmental conditions, in which a particular machine will operate.

The oil and gas industry provides a number of exemplary situations, where particular operating conditions of very large rotating machines require special mounting systems. Rotating machine arrangements typically include a prime mover, such as a gas turbine or electric motor, driving a load comprised of a rotating machine, e.g. an electric generator or a turbo-compressor. In the context of the present description and annexed claims, the term turbo-compressor is used to designate a dynamic-type compressor, such as an axial or centrifugal compressor.

The rotating machines are often arranged on a base plate or base frame, forming a single module arrangement. The base frame is in turn mounted on a supporting structure, such as an off-shore platform, or the deck of a marine vessel, or any other steel structure in general.

Typical applications of large rotating machines in the oil and gas industry include natural gas liquefaction facilities. Natural gas extracted from an offshore gas field is chilled and liquefied for transportation purposes. Refrigerants are processed in a chilling process for cooling and liquefying the natural gas. Turbo-compressors driven by gas turbine engines are used for processing the refrigerant in the refrigeration cycle. Gas turbine engines are also used for electric energy production purposes, for driving an electric generator. Large rotating turbo-compressors are also used in the field of oil and gas for gas injection and gas lift applications.

Base plates for rotating machines of this kind must be designed to resist high static and dynamic loads, due to the load of the rotating machines, as well as to the operation thereof. Dynamic loads include operative loads related to normal operation of the machine, as well as accidental and environmental loads. The former are due to abnormal operating conditions of the rotating machines, e.g. due to unbalances caused by blade losses in the turbine or to extreme events such as explosions.

The latter can be due e.g. to wave or wind action on the vessel or off-shore platform or seismic in case of fixed platform, where the rotating machines are installed.

An otherwise flat, generally planar vessel deck may experience torsional motion under the influence of wave action or other vibration and mechanical stresses, and in turn may transmit the torsional motion to the base plate, whereon the rotating machines are mounted.

While in on-shore applications the rotating machines are usually mounted by means of a multi-point, hyperstatic system (also named statically undeterminable or statically indeterminate systems) on the ground, hyperstatic mounting is generally considered unsuitable in off-shore applications, due to the above mentioned motions due e.g. to wave action or the like.

Twisting of a vessel deck due to wave action, for instance, can cause the mounting points of a hyperstatic, multi-point system to actually move out of the originally intended mounting plane. This in turn causes misalignment of the rotation shafts of the train of rotating machines mounted on the base frame or base plate. In case of equipment having low tolerances for misalignment of components, the above situation can be fatal.

In an attempt to address the above problems, three-point mounting systems have been developed. A three-point mounting system includes a base plate or base frame having an upper surface, where the rotating machines are installed, and a lower surface, where three supporting members are arranged. The supporting members connect the base frame to the deck of a vessel, or off-shore platform, or on any other supporting structure. The supporting members are located at the vertices of a triangle, which can be centered with the centerline of the base plate, or with the shaftline of the rotating machines arranged on top of the base plate or with Center of Gravity axial line.

The design of the supporting members is such as to provide an isostatic connection between the base plate and the supporting structure. For this purpose, each supporting member provides constraints such as to allow all rotating movements. Two supporting members are sliding in one direction while one supporting member is fixed also in translating movements, The single degree of freedom left by each of the two sliding support members allow e.g. thermal growth of the base frame with respect to the deck or other supporting structure, due to the heat generated by the turbomachinery during operation. This isostatic connection accommodates any displacement between base frame and supporting structure, without inducing additional deflection in the base frame that would negatively affect alignment of the rotating machines. Moreover, use of a three-point isostatic connection simplifies the design of the supporting structure, as it does not modify the global stiffness thereof.

Typically, gimbals, i.e. spherical joints mounted on pivoting pins, or anti-vibration mounts can be used as supporting members in this kind of three-point, isostatic mounting arrangements.

Three-point, isostatic connection systems have, however, some drawbacks. In particular, since the entire static and dynamic load must be supported by three supporting members only, these latter have often large dimensions. Moreover, dynamic and static loads on the deck of the vessel, or offshore platform, where the turbomachinery train is installed, are concentrated in three points.

Load concentration requires the supporting members and the deck to be dimensioned to withstand normal operating loads, as well as emergency or accidental loads like, for example, blasts load due to hydrocarbon explosions.

These aspects become particularly critical in case of very large machine components. The need for using three-point mounting systems, in order to avoid the disadvantages of multi-point, hyperstatic systems, limits the dimension of the rotating machines, which can be used.

Also the package surrounding the rotating machines mounted on a base plate can be supported by the base plate and contribute to the overall weight of the system. Thus, the use of three-point mounting systems can be difficult in case of heavy packages supported by the base plate, or can limit the maximum dimension and weight of the package.

The present disclosure is directed to one or more of the problems or shortcomings set forth above.

BRIEF DESCRIPTION OF THE INVENTION

According to first exemplary embodiments, there is a mounting system for supporting rotary machinery on a supporting structure of an off-shore installation, the system comprising: a base frame having an upper side for mounting the rotary machinery and a lower side;

a set of at least four supporting members arranged at the lower side of the base frame and adapted to be placed on the supporting structure to act as an intermediate layer or frame between the base frame and the supporting structure in mounting condition;

wherein the supporting members comprise resilient elements generating a reaction force when subject to load;

wherein the system has stiffness adapted to guarantee design acceptance criteria, for example regarding rotary machinery alignment, or minimizing the displacement between a point on the machinery and an absolute reference point located in a fixed position with respect to the supporting structure, or minimizing the dynamic behavior of the base frame;

wherein the supporting members are configured to transfer to the base plate stresses and/or strains lower than allowable limits also in case of deformation of the supporting structures.

In practice, although dealing with an off-shore application, the inventors surprisingly realized that a hyperstatic system typical of on-shore installations could be used if the base frame and the supporting members are smartly dimensioned. The supporting members stiffness is decreased (from typical $5 \cdot 10^8$ N/m down to $5 \cdot 10^7$ N/m) in order to improve the baseplate behavior without increasing its stiffness. This allows to guarantee linearity of the base plate in case of operating and also accidental load, like blasts, and reduced torsion transmittal from the supporting structure to the base plate or vice-versa. Flexible mounts, in fact, not only allows an increased vibration damping to the supporting structure, but also improves torsional behaviour of the base plate, transferring lower loads to the supporting structure therefore leading to lighter structures.

The supporting members can be simple springs of any type and shape as stiffness requirement is released due to the oversizing of the number of supporting members with respect to the isostatic solution. This allows to use cheaper spring-AVM compared to cushion-AVM. This is not the only advantage. Using more than three supporting members with increased flexibility also allows more uniform distribution of load; further optimization of baseplate design due to reduced baseplate torsion effect; reduction of the requirements for supporting structure stiffness of the deck (typical down to $5 \cdot 10^7$ N/m); lower vibration transmission to supporting structure; increase in blast resistance behavior reducing foundation loads due to blast on supporting structure.

BRIEF DESCRIPTION OF THE DRAWINGS

Embodiments of the present invention will become more apparent from the following description of exemplary embodiments to be considered in conjunction with accompanying drawings wherein.

DETAILED DESCRIPTION OF THE INVENTION

The following description of exemplary embodiments refer to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
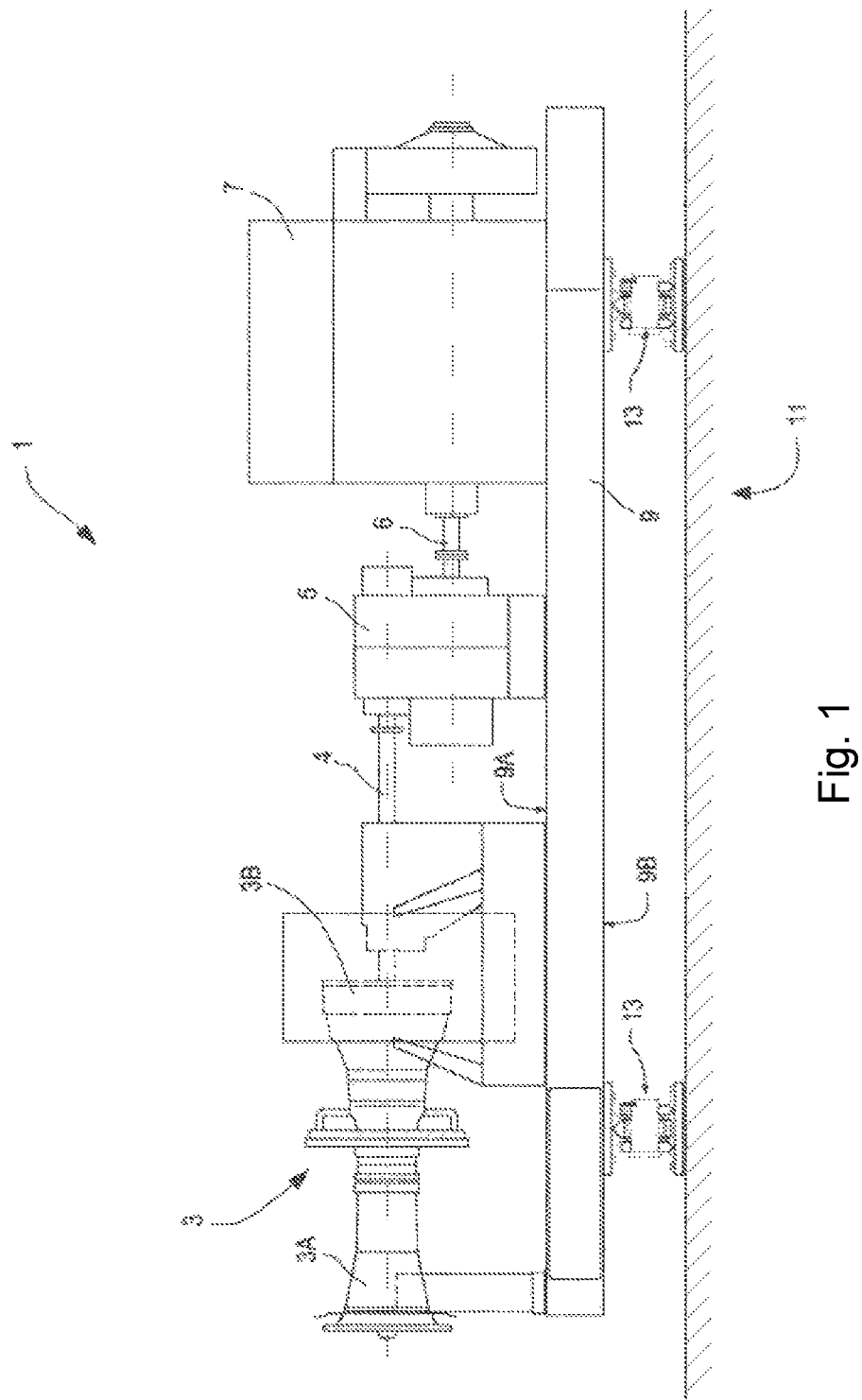
FIG. 1 illustrates a side view of a base frame with relevant rotating machinery mounted thereon and three supporting members according to the prior art.

FIG. 1 schematically illustrates a side view of a turbomachine system, which can be installed on an offshore platform, a marine vessel or the like. In some embodiments, the turbomachine system, labeled 1 as a whole, can comprise a gas turbine engine 3, comprised of a compressor section 3A and a turbine section 3B. The gas turbine engine 3 can drive a load, e.g. a turbo-compressor or turbo-compressor train, an electric generator, or any other rotating load. In the exemplary embodiment of FIG. 1 a driving shaft 4 of the gas turbine engine 3 transmits a rotary motion through a gearbox 5 to a driven shaft 6 of a load 7, e.g. a turbo-compressor, for instance a centrifugal turbo-compressor of an LNG system refrigeration system, i.e. for the liquefaction of natural gas.

In other embodiments two or more turbo-compressors can be arranged in series in the same train and be driven by the same gas turbine engine 3.

In some embodiments the gearbox 5 can be dispensed with and the gas turbine engine can be directly coupled to the load.

Additional rotating machines can be drivingly connected to the hot end or cold end of the gas turbine engine 3, e.g. a reversible electric machine, which can operate as a starter, helper or generator, upon needs and operating conditions of the rotating machinery train or rotating machines can be drivingly connected to Electric Motor which operates as engine.

The rotating machines are supported on the upper surface 9A of a base frame or base plate 9. In the exemplary schematic of FIG. 1 the rotating machines are mounted directly on the base frame 9. In other embodiments, an intermediate skid or frame can be arranged between one or more rotating machines and the base frame 9.

The base frame 9 can be mounted on a supporting structure, generally shown at 11. Typically, the supporting structure 11 can be the deck of a marine vessel, or else an offshore platform. A mounting arrangement including supporting members is provided between the lower surface 9B of the base frame 9 and the supporting structure 11. The mounting arrangement is configured and arranged so that flexural deformations of the supporting structure 11, e.g. due to wave action, does not cause misalignments of the rotating machines mounted on the base frame 9, as will be described in greater detail here below.

Figure 2:
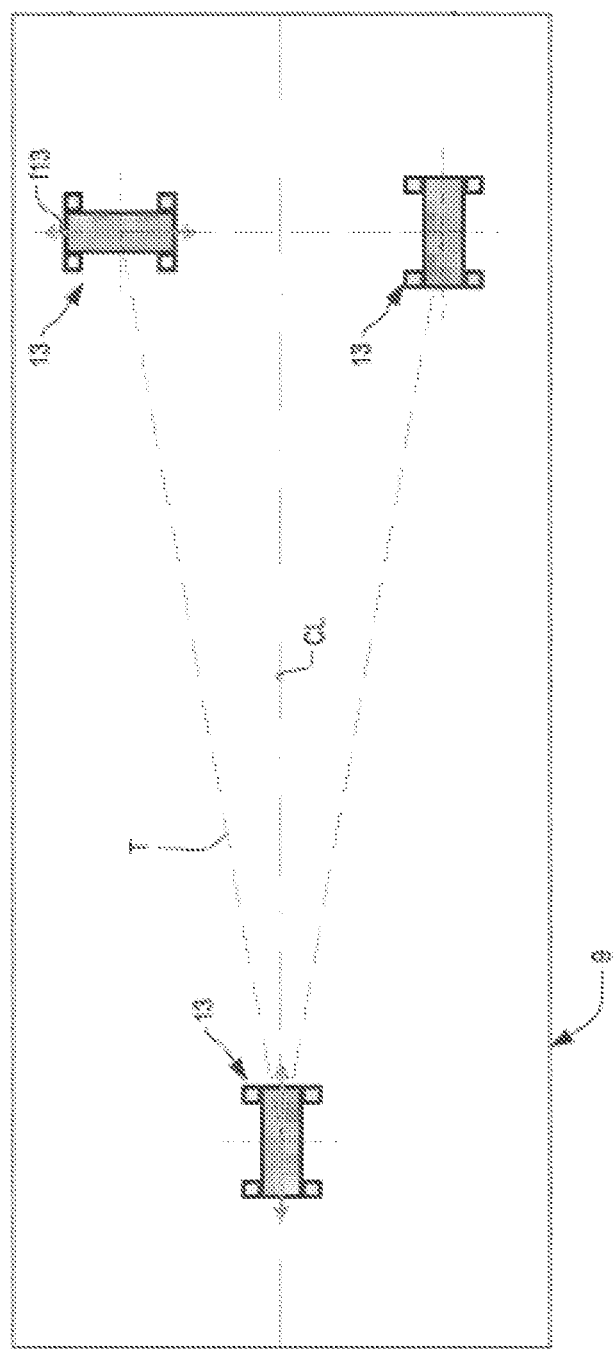
FIG. 2 illustrates a schematic plan view of the bottom base frame of FIG. 1.

In prior art systems as shown in FIG. 2, the mounting arrangement comprises three anti-vibration mounts 13 arranged at the vertices of a triangle T. The triangle T can be in turn substantially centered with respect to the center line CL of the base frame 9 or CoG.

The vertex Vx of the triangle T is located approximately under the center of the gas turbine engine 3. The base line B of the triangle T is located under the compressor 7, extending transversely to the rotation axis or centered with CoG axis thereof and at approximately 90° with respect to the latter. This arrangement provides, therefore, for two anti-vibration mounts 13 under the heavier one of the rotating machines 3, 5, 7 mounted on the base frame 9.

Double-ended arrows indicate the degrees of freedom given by two of the three anti-vibration mounts 13 illustrated. The third anti-vibration mount 13 is fixed and does not allow any degree of freedom in the horizontal plane. The movement allowed by the other two anti-vibration mounts 13 takes account of the need for the base frame 9 to undergo thermal expansions and contractions, for instance.

The three anti-vibration mounts 13 are mounted between the base frame 9 and the supporting structure 11, such that the base frame 9 is connected isostatically to the supporting structure 11 and relative movements of the base frame 9 with respect to the supporting structure 11, due e.g. to thermal expansion, are allowed by the motion capability of each anti-vibration mount 13. In FIG. 2 the movements allowed by each mount 13 is represented by a respective double arrow fl3. For instance, the two mounts 13 arranged underneath the compressor 7 allow a movement transversally to the centerline CL and therefore to the shaftline of the turbomachine arrangement. The anti-vibration mount 13 located under the gas turbine engine 3 allows a translation movement in a direction parallel to the shaftline and thus to the centerline CL.

The three anti-vibration mounts 13 are designed so as to withstand loads, which can arise during normal operation of the equipment mounted on the base frame 9. Normal operation should be understood as the operation of the machinery under nominal conditions, in the absence of accidental loads due e.g. to malfunctioning of any one of the rotating machines and/or to external environment factors, such as exceptional wind or wave activity in case of off-shore applications, which are not related to the operation of the machines.

Figure 3:
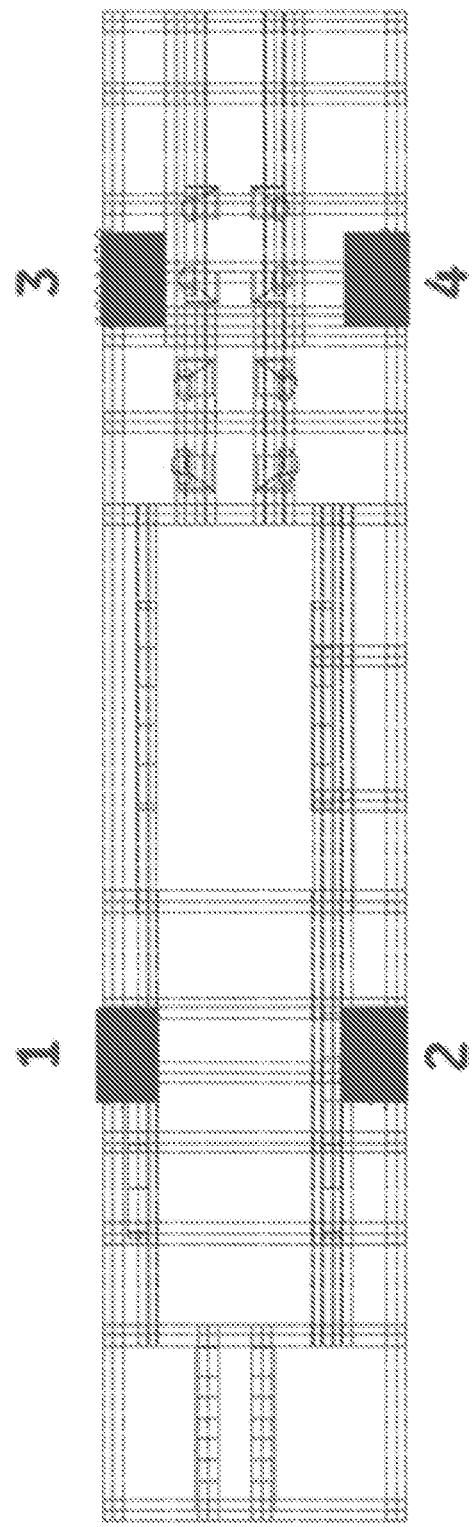
FIG. 3 illustrates a schematic plan view of the base frame with supporting members according to embodiments herein.

Referring to FIG. 3, the mounting system according to the prior art is replaced by four supporting members generally indicated with numbers 1 to 4 which are arranged between the base frame 9 and the supporting structure 11 and connect them to one another.

Each supporting member 1-4 is designed to provide a support reaction force, which is oriented in a substantially vertical direction, i.e. substantially orthogonal to the base frame 9. Reaction forces in the horizontal direction can be the same order of magnitude of vertical ones. In an embodiment, under normal operating conditions the supporting members 1-4 have a stiffness in vertical direction, which is substantially lower than the stiffness of the anti-vibration mounts used in a three-point isostatic configuration of the prior art. In some embodiments, the stiffness of the supporting member 1-4 is of at least about one order of magnitude less than the stiffness of such anti-vibration mounts (typically 5·10$8$ N/m). The stiffness of the supporting members is of the order of 107 N/m, typically from 2·107 N/m to 7·107 N/m, more typically 5·107 N/m.

Figure 4:
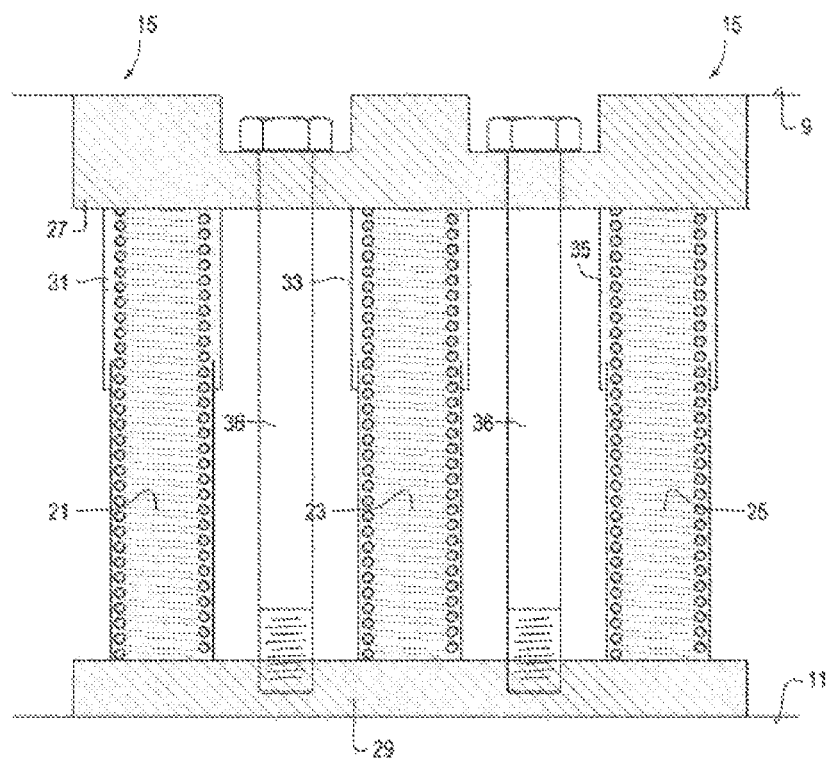
FIG. 4 illustrates exemplary embodiments of a supporting member for use in a mounting system according to embodiments herein.

FIG. 4 illustrates a schematic of an exemplary embodiment of a supporting member 15 that can be used. In this exemplary embodiment the supporting member 15 comprises a plurality of resilient elements. For instance three resilient elements 21, 23, 25 can be provided. In the schematic of FIG. 4 the resilient elements 21, 23, 25 are represented as compression springs, e.g. helical compression springs. In other embodiments Belleville springs can be used. In still further embodiments a combinations of different springs, e.g. helical and Belleville springs, can be provided. Also damping system (typical viscous type) can be included in the mount.

By way of example, in FIG. 4 the springs 21, 23, 25 are mounted between a top flange 27 and a bottom flange 29. The top flange 27 is configured for connection to the base frame 9 and the bottom flange 29 is configured for connection to die supporting structure 11, or vice-versa. Connection can be by bolts, welding, screwing or in any other suitable manner. In FIG. 4 bolts 36 are provided, which connect the two flanges 27 and 29 to one another.

The springs 21, 23, 25 can be housed in protective housings 31, 33, 35. The protective housings 31, 33, 35 can be telescoping, to allow extension and compression of the springs. The spring 23 can be pre-loaded by the bolts 36. The initial displacement is the displacement under pre-load conditions and is obtained by screwing the bolts 36.

As schematically shown in FIG. 4, the springs 21, 23, 25 are all equal lengths, but they can also have different lengths to show a differential stiffness behavior to compose a desired force-vs-displacement curve for maximum flexibility.

Furthermore some or parts of the supporting members can be of the AVM, for example cushion-AVM, according to the prior art although not positioned in a typical three-point isostatic arrangement. It is in fact the provision of a hyperstatic solution in a off-shore installation that represents the key of the present disclosure.

The supporting members can be placed in any suitable position, for example in a symmetric configuration of two members on opposing long sides of the base frame as shown in FIG. 3.

In some embodiments the supporting members can even be more than four for example arranged symmetrically with respect to the centerline CL of the base frame 9, or with respect to the shaftline of the rotating machines mounted on the base frame 9.

The optimal positioning as well the stiffness of the supporting members can be determined through a finite element analysis simulating all loads on the base frame.

The above described supporting system provides the advantages of an isostatic three-point supporting system without the limitations thereof. In particular, the supporting system becomes capable of supporting heavy rotating machinery without the need of designing over-dimensioned three-point supporting members.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

The invention claimed is:

1. A mounting system for supporting rotary machineries on a supporting structure of an off-shore installation, subject to dynamic flexural and torsional deformation, the mounting system comprising:
   a base frame having an upper side for mounting the rotary machineries and a lower side; and
   a set of at least four supporting members arranged separate and independent of each other at the lower side of the base frame and configured to be placed on the supporting structure;
   wherein each of the at least four supporting members are arranged at a vertex of a quadrilateral to form a hyperstatic system;
   wherein each of the supporting members comprise resilient elements generating a reaction force when subject to a load and a stiffness of each of the supporting members is between $2 \cdot 10^7$ N/m and $7 \cdot 10^7$ N/m;
   wherein the mounting system has stiffness to minimize a dynamic behavior of the base frame; and
   wherein the supporting members are configured to reduce the stresses and/or strains on the base frame resulting from the dynamic flexural and torsional deformation of the supporting structure to assure alignment of the rotary machineries.

2. The mounting system according to claim 1, wherein each of the at least four supporting members are arranged to form a vertex of a rectangle.

3. The mounting system according to claim 1, wherein the supporting members are in a symmetric configuration with two members per opposing long sides of the base frame.

4. The mounting system according to claim 1, wherein the supporting members are more than four arranged symmetrically with respect to a centerline of the base frame.

5. The mounting system according to claim 1, wherein the supporting members comprise spring elements mounted between a top flange and a bottom flange, wherein the top flange is configured for connection to the base frame and the bottom flange is configured for connection to the supporting structure or vice-versa such as to generate a reaction force substantially orthogonal to a base plate and/or the supporting structure.

6. The mounting system according to claim 1, wherein the supporting members have different stiffness.

7. The mounting system according to claim 6, wherein one or more of the supporting members has a curve force-vs-displacement with different steepness for different range of displacements, such behavior being obtained using a plurality of spring elements within the same supporting member having different lengths so as to be subject to a differential load and to be engaged sequentially.

8. The mounting system according to claim 1, wherein the supporting members comprise one or more anti-vibration mounts, particularly cushion-AVM, and/or one or more gimbals.

9. The mounting system according to claim 1, wherein the supporting members comprise a viscous damping system.

10. The mounting system according to claim 1, wherein the supporting members are more than four arranged symmetrically with respect to a shaftline of the rotary machineries mounted on the base frame.

11. The mounting system according to claim 1, wherein the supporting members are more than four arranged symmetrically with respect to center of gravity axis.

12. The mounting system according to claim 1, wherein the stiffness of the supporting members is $5 \cdot 10^7$ N/m.

13. A support system for supporting rotary machineries; the support system comprising:
   a supporting structure of an off-shore installation, wherein the supporting structure is subject to dynamic flexural and torsional deformation and a stiffness of a set of at least four supporting members is between $2 \cdot 10^7$ N/m and $7 \cdot 10^7$ N/m; and
   a mounting system to mount the rotary machineries to the supporting structure; the mounting system comprising:
   a base frame having an upper side for mounting the rotary machineries and a lower side; and
   the set of at least four supporting members arranged separate and independent of each other at the lower side of the base frame and configured to be placed on the supporting structure;
   wherein each of the at least four supporting members are arranged at a vertex of a quadrilateral to form a hyperstatic system;
   wherein each of the supporting members comprise resilient elements generating a reaction force when subject to a load, resulting from the dynamic flexural and torsional deformation of the supporting structure;
   wherein the mounting system has the stiffness to minimize the dynamic behavior of the base frame; and
   wherein the supporting members are configured to reduce the stresses and/or strains on the base frame resulting from the dynamic flexural and torsional deformation of the supporting structure to assure alignment of the rotary machineries.

14. The support system according to claim 13, wherein the support structure is a deck of a vessel or an off-shore platform.

15. The support system according to claim 13, wherein the supporting members are more than four arranged symmetrically with respect to a centerline of the base frame.

16. The support system according to claim 13, wherein the supporting members are in a symmetric configuration with two members per opposing long sides of the base frame.

17. The support system according to claim 13, wherein the supporting members are more than four arranged symmetrically with respect to a shaftline of the rotating machines mounted on the base frame.

18. The support system according to claim 13, wherein the supporting members are more than four arranged symmetrically with respect to center of gravity axis.

* * * * *